United States Patent
Lee et al.

(10) Patent No.: US 7,822,716 B2
(45) Date of Patent: Oct. 26, 2010

(54) METHOD FOR DELETING USER METADATA MANAGED BY A TV-ANYTIME METADATA SERVER USING AN SOAP OPERATION

(75) Inventors: Jong Seul Lee, Sungnam (KR); Seok Pil Lee, Sungnam (KR); Tae Beom Lim, Anyang (KR); Kyoung Ro Yoon, Seoul (KR)

(73) Assignee: Korea Electronics Technology Institute, Sungnam-si (KR)

( * ) Notice: Subject to any disclaimer, the term of this patent is extended or adjusted under 35 U.S.C. 154(b) by 576 days.

(21) Appl. No.: 11/192,063

(22) Filed: Jul. 29, 2005

(65) Prior Publication Data

US 2006/0074887 A1    Apr. 6, 2006

(30) Foreign Application Priority Data

Sep. 17, 2004  (KR) ............... 10-2004-0074549
Mar. 29, 2005  (KR) ............... 10-2005-0025886

(51) Int. Cl.
    *G06F 17/00*  (2006.01)
(52) U.S. Cl. ................................ 707/662
(58) Field of Classification Search ............ None
    See application file for complete search history.

(56) References Cited

U.S. PATENT DOCUMENTS

| 7,051,038 | B1 * | 5/2006 | Yeh et al. ............ 707/102 |
| 7,222,131 | B1 * | 5/2007 | Grewal et al. ......... 707/104.1 |
| 7,496,834 | B2 * | 2/2009 | Jeon et al. ........... 715/234 |
| 2003/0028451 | A1 * | 2/2003 | Ananian ............. 705/27 |
| 2003/0225829 | A1 | 12/2003 | Pena et al. |
| 2004/0123109 | A1 * | 6/2004 | Choi ................. 713/176 |
| 2004/0165724 | A1 * | 8/2004 | Choi et al. ........... 380/45 |
| 2004/0208480 | A1 * | 10/2004 | Yoon et al. ........... 386/69 |
| 2005/0015619 | A1 * | 1/2005 | Lee ................... 713/201 |
| 2005/0144285 | A1 * | 6/2005 | Hickman .............. 709/227 |
| 2005/0182843 | A1 * | 8/2005 | Reistad et al. ......... 709/230 |
| 2005/0267772 | A1 * | 12/2005 | Nielsen et al. ......... 705/1 |
| 2006/0002520 | A1 * | 1/2006 | Bettis et al. .......... 379/88.17 |

(Continued)

OTHER PUBLICATIONS

Extensible Markup Language (XML) 1.0 (Second Edition), W3C Recommendation, Oct. 6, 2000. Editors: Bray, Paoli, Sperber-McQueen and Maler. http://www.w3org/TR/200/REC-xml-20001006.

(Continued)

*Primary Examiner*—Neveen Abel Jalil
*Assistant Examiner*—Kellye D Buckingham
(74) *Attorney, Agent, or Firm*—Sughrue Mion, PLLC

(57) ABSTRACT

The present invention relates to a method or an operation for providing a personalized TV-Anytime metadata service. According to an embodiment of the present invention, there is provided a method of deleting user metadata managed by a TV-Anytime metadata server using a SOAP operation, comprising the steps of a) providing an element type of a SOAP delete operation, the element of the SOAP delete operation including at least a first sub-element for designating user identifier information, b) receiving the element of the SOAP delete operation, in which the user identifier information is designated, from a client of a user, and c) identifying the user on the basis of the user identifier information in the received element of the SOAP delete operation and deleting user metadata about the identified user.

12 Claims, 7 Drawing Sheets

U.S. PATENT DOCUMENTS

2006/0090195 A1* 4/2006 Pearson et al. .................. 726/3
2006/0235976 A1* 10/2006 Chen et al. .................. 709/227
2008/0072054 A1* 3/2008 Choi .......................... 713/176

OTHER PUBLICATIONS

Namespaces in XML, W3C Recommendation, Jan. 14, 1999. Editors: Bray, Hollander and Layman. http://www.w3.org/TR/1999/REC-xml-names-19990114.

Requirements and Scenarios for the Bi-directional Transport of Metadata, TV150r1, The TV-Anytime Forum. http://www.tv-anytime.org.

Request for Comments: 1591. Domain Name System Structure and Delegation, J. Postel, Mar. 1994. http://www.ietf.org/rfc/rfc1591.txt.

Request for Comments: 1945. Hypertext Transfer Protocol—HTTP/1.0. Berners-Lee et al., May 1996. http://www.ietf.org/rfc/rfc1945.txt.

Request for Comments: 2119. Key words for use in RFCs to Indicate Requirement Levels. S: Bradner, Mar. 1997. http://www.ietf.org/rfc/rfc2119.txt.

Request for Comments: 2396. Uniform Resource Identifiers (URI): Generic Syntax. Berners-Lee et al., Aug. 1998. http://www.ietf.org/rfc/rfc2396.txt.

Request for Comments: 2616. Hypertext Transfer Protocol—HTTP/1.1. Fielding et al., Jun. 1999. http://www.ietf.org/rfc/rfc2616.txt.

Simple Object Access Protocol (SOAP) 1.1, W3C Note, May 8, 2000. Authors: Box, Ehnebuske, Kakivaya, Layman, Mendelsohn, Nielsen, Thatte, and Winer. http://www.w3.org/TR/2000/NOTE-SOAP-20000508.

TV-Anytime Requirements Series: R-1, TV035r6, The TV-Anytime Forum. http://www.tv-anytime.org.

TV-Anytime Specification on Content Referencing, SP004v12. Final Specification, Version 1.2. The TV-Anytime Forum. http://www.tv-anytime.org.

TV-Anytime Specification on Metadata, SP003v13. Final Specification, Version 1.3. The TV-Anytime Forum. http://www.tv-anytime.org.

TV-Anytime Specification on Metadata Protection, SP007v10. Final Specification, Version 1.0. The TV-Anytime Forum. http://www.tv-anytime.org.

TV-Anytime Specification on System, SP002v13. Final Specification, Version 1.3. The TV-Anytime Forum. http://www.tv-anytime.org.

Unicode Collation Algorithm, Unicode Technical Standard #10. Authors: Davis and Whistler. May 5, 2005. http://www.unicode.org/unicode/reports/tr10.

Unicode Normalization Forms, Unicode Standard Annex #15. Authors: David and Dürst. Mar. 25, 2005. http://www.unicode.org/unicode/reports/tr15.

Universal Description Discovery & Integration, Version 3.0. Authors: Bellwood, Clément, Ehnebuske, Hately, Hondo, Husband, Januszewski, Lee, McKee, Munter and von Riegen. Jul. 19, 2002. http://uddi.org/pubs/uddi-v.3.00-published-20020719.htm.

Web Services Description Language (WSDL), Version 1.1, W3C Note, Mar. 15, 2001. http://www.w3.org/TR/2001/NOTE-wsdl-20010315.

Web Services Inspection Language, Version 1.0. Authors: Ballinger, Brittenham, Malhotra, Nagy, and Pharies. Nov. 2001.

XML Schema, W3C Recommendation (Version 1.0). May 2, 2002. http://www.w3.org/TR/2001/REC-xmlschema-0-20010502, http://www.w3.org/TR/2001/REC-xmlschema-1-20010502, http://www.w3.org/TR/2001/REC-xmlschema-2-20010502.

The Platform for Privacy Preferences 1.0 (P3P1.0) Specification. Editor: Marchiori. Apr. 16, 2002. http://www.w3.org/TR/P3P/.

The WS-Inspection and UDDI Relationship. Authors: Nagy and Ballinger, Nov. 1, 2001. http://www-106.ibm.com/developerworks/webservices/library/ws-wsiluddi.html.

ETSI TS 12 822-6-1 Broadcast and On-line Services: Search, select, and rightful use of content on personal storage systems ("TV-Anytime Phase 1"); Part 6: Delivery of metadata over a bi-directional network; Sub-part 1: Service and transport Oct. 2003 pp. 1-59.

* cited by examiner

[FIG. 1]
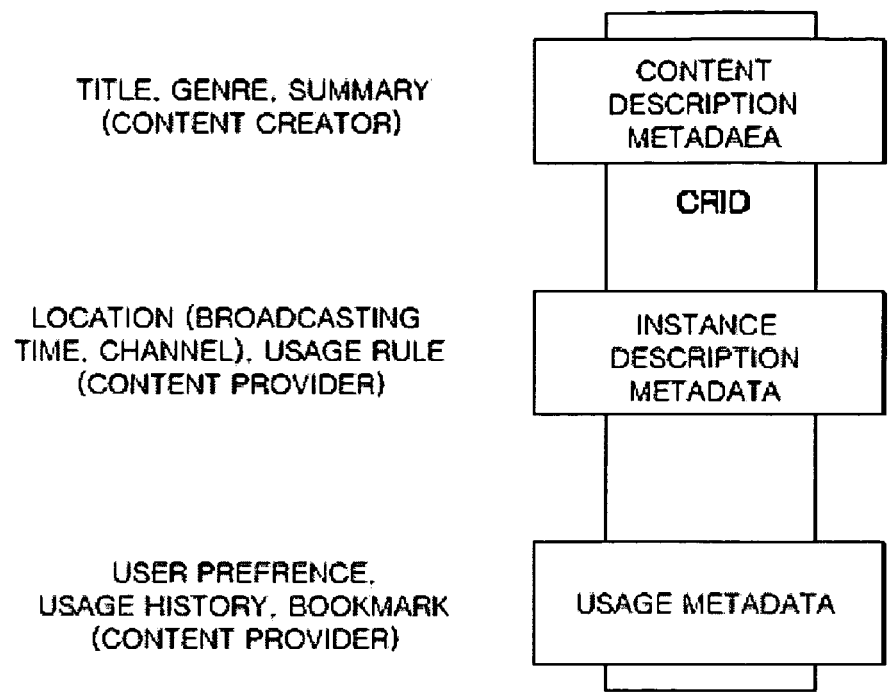
[FIG. 2]
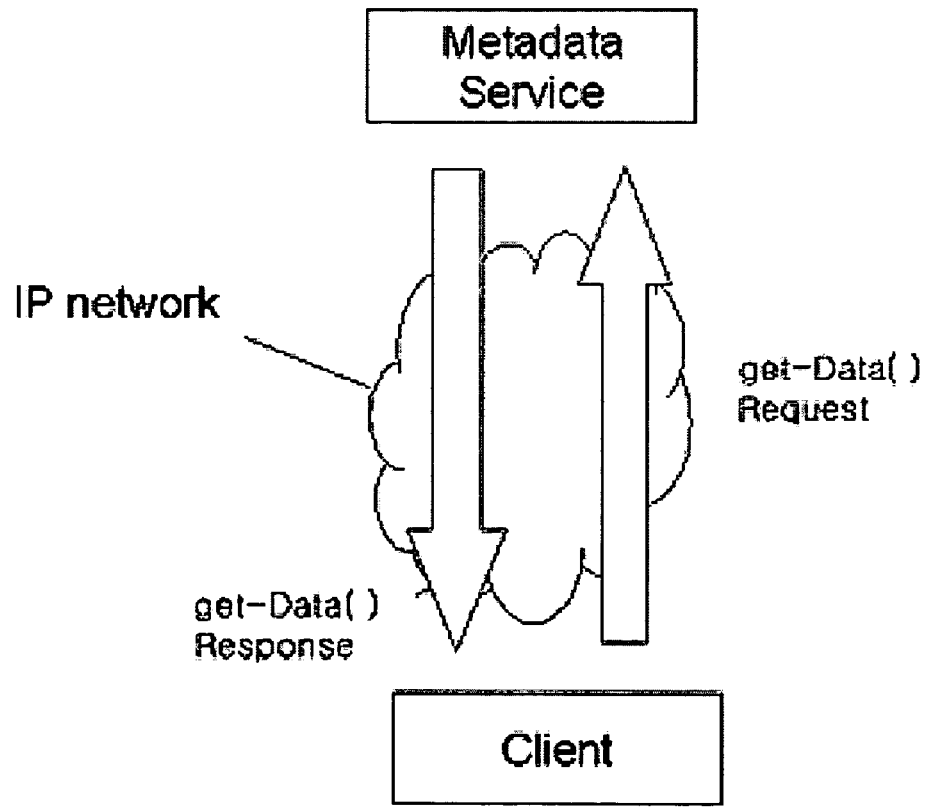

[FIG. 3]

```
<element name="get_Data" type="tns:get_Data"/>
 <complexType name="get_Data">
  <sequence>
   <element name="QueryConstraints">
    <complexType>
     <choice>
      <element name="PredicateBag" type="tns:PredicateBagType"/>
      <element name="BinaryPredicate" type="tns:BinaryPredicateType"/>
      <element name="UnaryPredicate" type="tns:UnaryPredicateType"/>
     </choice>
    </complexType>
   </element>
   <element name="RequestedTables" type="tns:RequestedTablesType"/>
  </sequence>
  <attribute name="maxPrograms" type="unsignedInt"/>
 </complexType>
```

[FIG. 4]

```xml
<element name="get_Data" type="tns:get_Data"/>
  <complexType name="get_Data">
    <sequence>
      <element name="QueryConstraints">
        <complexType>
          <choice>
            <element name="PredicateBag" type="tns:PredicateBagType"/>
            <element name="BinaryPredicate" type="tns:BinaryPredicateType"/>
            <element name="UnaryPredicate" type="tns:UnaryPredicateType"/>
          </choice>
        </complexType>
      </element>
      <element name="RequestedTables" type="tns:RequestedTablesType"/>
    </sequence>
    <attribute name="maxPrograms" type="unsignedInt"/>
  </complexType>

<complexType name="RequestedTablesType">
  <sequence>
    <element name="Table" maxOccurs="unbounded">
    <complexType>
     <sequence>
<element name="SortCriteria" type="tns:SortCriteriaType" minOccurs="0" maxOccurs="unbounded"/>
     </sequence>
      <attribute name="type" use="required">
      <simpleType>
<restriction base="string">
<enumeration value="ContentReferencingTable"/>
<enumeration value="ClassificationSchemeTable"/>
<enumeration value="ProgramInformationTable"/>
<enumeration value="GroupInformationTable"/>
<enumeration value="CreditsInformationTable"/>
<enumeration value="ProgramLocationTable"/>
<enumeration value="ServiceInformationTable"/>
<enumeration value="ProgramReviewTable"/>
<enumeration value="SegmentInformationTable"/>
</restriction>
      </simpleType>
      </attribute>
     </complexType>
    </element>
   </sequence>
  </complexType>
```

[FIG. 5]

```
<element name="get_Data_Result" type="tns:get_Data_ResultType"/>
  <complexType name="get_Data_ResultType">
    <sequence>
      <element name="TableSortingInformation"
            type="tns:RequestedTablesType" minOccurs="0"/>
      <element ref="tva:TVAMain" minOccurs="0"/>
      <element ref="cr:ContentReferencingTable" minOccurs="0"/>
      <element name="InvalidFragments"
            type="tns:InvalidFragmentsType" minOccurs="0"/>
    </sequence>
    <attribute name="serviceVersion" type="unsignedInt" use="required"/>
    <attribute name="truncated" type="boolean"/>
```

[FIG. 6]

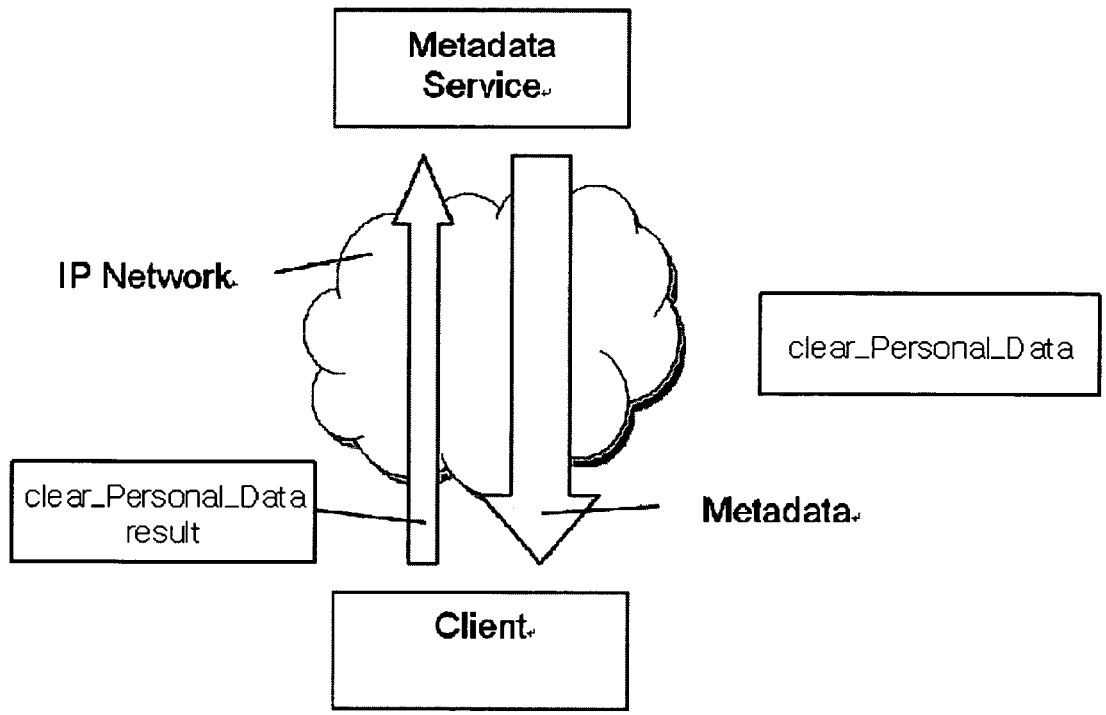

[FIG. 7]

```
<element name="clear_Personal_Data" type="tns:clear_Personal_DataType"/>

<complexType name="clear_Personal_DataType">
    <sequence>
        <element name="DateFrom" type="tva:TVATimeType" minOccurs= "0"/>
        <element name="DateTo" type="tva:TVATimeType" minOccurs= "0"/>
        <element name="UserIdentifier" type="mpeg7:UserIdentifierType" maxOccurs="unbounded"/>
    </sequence>
</complexType>

<element name="clear_Personal_Data_Result" type="tns:clear_Personal_Data_ResultType"/>

<simpleType name="clear_Personal_Data_ResultType">
   <restriction base="string">
    <enumeration value="success"/>
    <enumeration value="system error"/>
    <enumeration value="no data"/>
   </restriction>
   </simpleType>
   </restriction>
</simpleType>
```

[FIG. 8]

```
<element name="clear_Personal_Data" type="tns:clear_Personal_DataType"/>
  <complexType name="clear_Personal_DataType">
    <sequence>
      <element name="TimeFrom" type="tva:TVATimeType" minOccurs="0"/>
<element name="TimeTo" type="tva:TVATimeType" minOccurs="0"/>
<element name="TargetTable" type="tns:clear_TableType" minOccurs="0" maxOccurs="unbounded"/>
    </sequence>
  </complexType>
  <simpleType name="clear_TableType">
    <restriction base="string">
      <enumeration value="All"/>
      <enumeration value="UserInformationTable"/>
      <enumeration value="UsageEnvironment"/>
      <enumeration value="BioGraphicInformation"/>
      <enumeration value="AccessibilityInformation"/>
<enumeration value="TerminalInformationTable"/>
<enumeration value="NetworkInformationTable"/>
<enumeration value="NaturalEnvironmentInformationTable"/>
</restriction>
  </simpleType>
```

[FIG. 9]

```
<element name="clear_Personal_Data_Result" type="tns:clear_Personal_Data_Result"/>
  <complexType name="clear_Personal_Data_Result">
  <attribute name="serviceVersion" type="unsignedInt" use="required"/>
    <attribute name="status" use="required">
      <simpleType>
        <restriction base="string">
          <enumeration value="success"/>
          <enumeration value="failed"/>
          <enumeration value="no data"/>
        </restriction>
      </simpleType>
    </attribute>
  </complexType>
```

[FIG. 10]

```
<element name="clear_Personal_Data" type="tns:clear_Personal_DataType"/>
 <complexType name="clear_Personal_DataType">
  <sequence>
   <element name="TimeFrom" type="tva:TVATimeType" minOccurs="0"/>
   <element name="TimeTo" type="tva:TVATimeType" minOccurs="0"/>
   <element name="TargetTable" type="tns:PersonalInformationTableType"
   maxOccurs="unbounded"/>
  </sequence>
 </complexType>
 <simpleType name="PersonalInformationTableType">
  <restriction base="string">
   <enumeration value="All"/>
   <enumeration value="UserInformationTable"/>
   <enumeration value="UsageEnvironment"/>
   <enumeration value="UsageHistory"/>
   <enumeration value="UserPreference"/>
   <enumeration value="BioGraphicInformation"/>
   <enumeration value="AccessibilityInformation"/>
   <enumeration value="TerminalInformationTable"/>
   <enumeration value="NetworkInformationTable"/>
   <enumeration value="NaturalEnvironmentInformationTable"/>
  </restriction>
 </simpleType>
```

METHOD FOR DELETING USER METADATA MANAGED BY A TV-ANYTIME METADATA SERVER USING AN SOAP OPERATION

RELATED APPLICATIONS

The present disclosure relates to subject matter contained in priority Korean Application Nos. 10-2004-0074549, filed on 17 Sep. 2004 and 10-2005-0025886, filed on 29 Mar. 2005, which are herein expressly incorporated by reference in its entirety.

BACKGROUND OF THE INVENTION

1. Field of the Invention

The present invention relates, in general, to a TV-Anytime service and, more particularly, to a method for deleting user metadata managed by a TV-Anytime metadata server, using an SOAP operation.

2. Description of the Related Art

Recently, as a digital broadcasting service has become popularized, research into technology for providing a customized broadcasting service in a multichannel multimedia environment has been actively carried out. For example, TV-Anytime, which is a nonofficial international standard, is a standard for providing an anytime service of allowing a user to match his or her preferences with metadata on the basis of the metadata including description information of contents, to store desired contents, and to freely watch desired broadcast contents at any time.

As described above, metadata, which is description information about contents, includes content-based description information defined in Moving Picture Experts Group (MPEG)-7 and Electronic Program Guide (EPG) information in TV-Anytime service, and allows a user to easily search for and select desired contents. The metadata standard is composed of two parts. Part A defines a format for representing metadata, that is, a schema, and utilizes eXtensible Markup Language (XML)-based MPEG-7 Description Definition Language (DDL) [International Organization for Standardization (ISO)/International Electrotechnical Commission (IEC) 15938-2]. Part B relates to the transmission of metadata and includes a binary format (MPEG-7 BiM: Binary Format for MPEG-7) (ISO/IEC 15938-1), a fragmentation model, an encapsulation mode and an indexing method.

FIG. 1 is a view showing the configuration of TV-Anytime metadata, which includes program description metadata and user description metadata. The program description metadata includes content description metadata and instance description metadata. Metadata for a single program are interrelated via a content identifier called a Content Reference Identifier (hereinafter referred to as a "CRID").

Content description metadata is created by a content creator and includes a program title, genre, summary, critic's reviews, etc. Instance description metadata is created by a content provider and includes location [broadcast time, channel, Uniform Resource Locator (URL), etc.], usage rule, delivery parameter, etc. User description metadata includes user preference, usage history, personal bookmarks, etc., and is created by a user.

TV-Anytime standards define two-types of metadata Web services for bi-directional metadata services using a return path: one is a well-defined behavior and the other is a remote procedure for an input/output set. In eXtensible Markup Language (XML)-based Web Service Description Language (WSDL) standards, the above-described remote procedure is defined in the form of a Simple Object Access Protocol (hereinafter referred to as "SOAP") operation, and includes a "get_Data" operation used to search for metadata and a "submit_Data" operation used for user description submission. For reference, the above-described SOAP is an XML-based communication protocol enabling access to an object in a distribution environment.

Request/response types used in the TV-Anytime metadata service are defined in a namespace of "urn:tva:transport:2002", which is provided as a tool for verifying a variety of messages. Types defined in metadata specification and content referencing standards are referred to in a transport namespace. Schema fragments are defined by the above-described namespace, and a namespace provider is defined in the form of "tns:" in the schema fragments. A perfect XML schema file has a form of tva_transport_types_v10.xsd.

1. get_Data Operation

The get_Data operation provides a function of allowing a client to search a server for TV-Anytime data about a program or a program group. Functions that can be provided by a TV-Anytime metadata provider using the get_Data operation are exemplified by the following description.

return content reference data for CRID using CRID list return TV-Anytime metadata for CRID using CRID list receive query for specific metadata attributes (for example, genre, actor, etc.) and return programs corresponding to the query return corresponding programs in response to a query for a specific time or specific channel Referring to FIG. 2 in relation to the execution of a get_Data operation, a client transmits a SOAP request message [i.e. get_Data Request element of FIG. 3] using the get_Data operation to a metadata service server through the Internet [Internet Protocol (IP) network]. At this time, the get_Data operation supports all types of queries as a rule, and provides extensive queries for metadata constraints. Then, the metadata service server returns a query result value corresponding to the SOAP request message using a SOAP response message [get_Data Response element of FIG. 5].

a. Request Format

As shown in FIG. 3, a request format assigns three types of parameters to a client in the get_Data operation, and assigns an element type, returned as a query (search) result value, to the type of RequestedTables.

FIG. 4 shows an example in which the RequestedTables type, returned as a query result, is assigned to ClassificationSchemetable, ProgramInformationTable, GroupInformationTable, CreditsInformationTable, ProgramLocationTable, ServiceInformationTable, ProgramReviewTable, SegmentInformationTable, etc.

b. Response Format

As shown in FIG. 5, the response format of the get_Data operation includes 0 or at least one XML instance documents with respect to elements, such as, TVAMain, ContentReferencingTable, and InvalidFragments, and returns a query result value according to the type of RequestedTables requested in the request format.

2. submit_Data Operation

In TV-Anytime's phase I standard, the submit_Data operation is limited to data defined by a set of anonymous profile data created by intelligent agents based on a usage service and contents or by manual input. A TV-Anytime forum respects and includes basic rights of all users and providers, and includes private rights of content users and legal rights of all participators, such as content creators, content providers and service providers.

3. get_Data Operation Using User Information

In a current TV-Anytime service, service agents perform a get_Data operation using algorithms specific for each agent on the basis of user metadata transmitted through the submit_Data operation, and transmit corresponding results to users.

As described above, the user information provided to the service agent in this way is used according to the policy of a service provider. For example, user information collected for a specific period or all of the user information can be used. When the user information is used according to the policy of the service agent, there is an advantage in that more convenience can be provided to a user, but there is a disadvantage in that a method of allowing the user to delete his or her own information has not been provided when the user does not require a service from a service agent, that is, when service results provided by a service agent according to previously accumulated personal information are not suitable.

Moreover, since a method of processing user metadata is based entirely on algorithms provided by a service provider, the user cannot regulate the use of his or her own information, etc., so that the user may hesitate to use a bi-directional metadata service.

SUMMARY OF THE INVENTION

Accordingly, the present invention has been made keeping in mind the above problems occurring in the prior art, and an object of the present invention is to provide a method for providing a personalized TV-Anytime metadata service, which provides a method of deleting user information that had been transmitted to a metadata server or a service agent through a submit_Data operation, thus allowing a user to have some ability to control his or her own information.

In accordance with a first aspect of the present invention, there is provided a method of deleting user metadata managed by a TV-Anytime metadata server using a SOAP operation, comprising the steps of a) providing an element type of a SOAP delete operation, the element of the SOAP delete operation including at least a first sub-element for designating user identifier information, b) receiving the element of the SOAP delete operation, in which the user identifier information is designated, from a client of a user, and c) identifying the user on the basis of the user identifier information in the received element of the SOAP delete operation and deleting user metadata about the identified user.

Preferably, the user metadata deletion method may further comprise the step of d) transmitting deletion results obtained at step q) to the client. Further, the element of the SOAP delete operation defined at step a) may further include a second sub-element for designating a delete condition, and the step c) may be performed to delete user information corresponding to the delete condition designated in the second sub-element of the received SOAP delete operation element.

In accordance with a second aspect of the present invention, there is provided a method of deleting non-anonymous user metadata managed by a TV-Anytime metadata server using a SOAP operation, comprising the steps of e) providing a SOAP delete operation, a request element of which includes an element for receiving start and end points of non-anonymous user metadata to be deleted and a target table element for receiving a table to be deleted, and a response element of which includes version information (serviceVersion) about a metadata capability description and reception results; f) a client inputting start and end points of non-anonymous user metadata to be deleted and a target table to be deleted, to the request element, and transmitting the request element to the server; and g) the server deleting the non-anonymous user metadata between the start and end points from the target table in response to reception of the request element, inputting deletion results and version information to the response element, and transmitting the response element to the client.

BRIEF DESCRIPTION OF THE DRAWINGS

FIG. 1 is a view showing the configuration of TV-Anytime metadata;

FIG. 2 is a conceptual view showing the typical execution of a get_Data operation;

FIG. 3 is a view showing the request format of a conventional get_Data operation;

FIG. 4 is a view showing an example of the type of RequestedTables returned as the results of a query in the conventional get_Data operation;

FIG. 5 is a view showing the response format of the conventional get_Data operation;

FIG. 6 is a conceptual view showing the execution of a clear_Personal_Data operation according to the present invention;

FIG. 7 is a view showing a request and response format of the clear_Personal_Data operation according to a first embodiment of the present invention; and FIGS. 8 and 9 are views showing another request format and response format of the clear_Personal_Data operation according to a second embodiment of the present invention.

FIG. 10 is a view showing still another format of the clear_Personal_Data operation according to a third embodiment of the present invention.

DESCRIPTION OF THE PREFERRED EMBODIMENTS

Hereinafter, embodiments of the present invention will be described in detail with reference to the attached drawings.

FIG. 6 is a conceptual view showing the execution of a clear_Personal_Data operation provided to delete user information according to the present invention.

Referring to FIG. 6, the clear_Personal_Data operation is an operation of deleting user information transmitted to a bi-directional server. A client transmits a SOAP message, i.e. clear_Personal_Data Request element, including user identifier information (UserIdentifier) and a period during which information to be deleted had been transmitted, to a service agent of a metadata service server through the use of the clear_Personal_Data operation, and may use the Internet (IP network). At this time, for policies for deleting user information, i) user information (user metadata) transmitted on or after a reference date and before a designated date can be deleted, or ii) all of the user information can be deleted. Thereafter, the service agent transmits results obtained by the deletion of the user information (clear_Personal_Data_Result element) to the client.

FIG. 7 is a view defining the request and response format of the above-described clear_Personal_Data operation according to a first embodiment of the present invention.

Referring to FIG. 7, the clear_Personal_Data operation has elements dateFrom, dateTo and UserIdentifier. The elements dateFrom and dateTo indicate the dates during which user information should be deleted, and the element UserIdentifier is used to identify a corresponding user.

In detail, the element dateFrom is a start date from which user information is to be deleted, and the element dateTo is an end date to which user information is to be deleted. For example, if user data transmitted from March 6 in 2003 to July 8 in 2004 are to be deleted, a value 20030306 can be applied to the element dateFrom and a value 20040708 can be applied to the element dateTo. The elements dateFrom and dateTo are designated as minOccurs="0", respectively, so that one of the elements may be set, or neither may be set. If only the value of dateTo is set, all of the user data transmitted on and before dateTo can be deleted, while if only the value of dateFrom is set, all of the user data transmitted on and after dateFrom can be deleted. When neither dateFrom nor dateTo are set, all of the user data are deleted regardless of a date.

As shown in FIG. 6 in relation to the execution of the clear_Personal_data operation, results obtained by performing a delete operation in response to receiving the request element of the clear_Personal_Data are transmitted through clear_Personal_Data_ResultType element. At this time, the result values can be selected among success, system error or no data. Success indicates that a corresponding process has performed successfully, system error indicates that a delete operation cannot be performed due to the current status of a system, and no data indicates that data to be deleted do not exist.

FIGS. 8 and 9 are views showing the request format and response format of a SOAP operation clear_Personal_Data for deleting non-anonymous user metadata according to a second embodiment of the present invention.

First, referring to FIG. 8, the clear_Personal_Data operation according to the second embodiment of the present invention is an operation allowing a user to delete user information that has been transmitted to a server using the above-described upload_Personal_Data operation, and selectively provides the following functions.

1. delete user information for a specific user transmitted during a specific period
2. delete only a selected table for a specific user transmitted during a specific period
3. delete all pieces of information about a selected table for a specific user that has been transmitted
4. delete all pieces of information about a specific user For these functions, the input of the clear_Personal_Data operation uses elements specifying a specific period of user information to be deleted, for example, "TimeFrom" and "TimeTo". The element TimeFrom specifies the start point of user data to be deleted, and element TimeTo specifies the end point of the user data to be deleted. Further, in these elements, minOccurs="0" is designated, so that only one of the elements can be set, or neither of the elements can be set. If only the value of TimeTo is designated, all non-anonymous user data transmitted before the TimeTo can be deleted. If only the value of TimeFrom is designated, all non-anonymous user data transmitted after the TimeFrom can be deleted. If neither the TimeFrom nor the TimeTo is designated, all user data are deleted regardless of a period.

Further, the clear_Personal_Data operation includes a separate target table element TargetTable for specifying a table to be deleted. The type of the target table element TargetTable is defined as "clear_TableType" as shown in FIG. 8. As described above, tables including user information are restricted to the top level and second level of the above-described ExtendedUserDescriptionType, so that the operation can be simply implemented.

Referring to FIG. 9, as described in the upload_Personal_Data operation, the response result of the clear_Personal_Data operation must include information about current service version serviceVersion. One of success, failed and no data is selected as the result (status) of a delete operation, and is reported to the user.

Finally, referring to FIG. 10, which shows a modified request format of the clear_Personal_Data operation according to a third embodiment of the present invention, the type of the target table element TargetTable may be represented as "tns:PersonalInformationTableType". The TargetTable may include device-related tables, such as, TerminalInformationTable, NetworkInformationTable, NaturalInvironmentInformationTable, and so on, which are further defined by the TV-Anytime Forum. And, either or all of the tables may be deleted by the operation. Further, sub-tables of a table element UserInformationTable included in the TargetTable, such as UsageHistory and Userpreference, may be deleted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of deleting user metadata managed by a TV-Anytime metadata server using a simple object access protocol (SOAP) operation, the method comprising:
   a) providing an element of a SOAP delete operation, the element of the SOAP delete operation including at least a first sub-element for designating user identifier information with respect to a user and a second sub-element for designating a delete condition;
   b) receiving at the TV-Anytime metadata server the element of the SOAP delete operation from a client of the TV-Anytime service; and
   c) identifying the user and deleting user metadata of the identified user at the TV-Anytime metadata server on a basis of the user identifier information in the received element of the SOAP delete operation,
   wherein the TV-Anytime metadata server is located at a provider of the TV-Anytime service and keeps user metadata of a plurality of users including the user, and
   wherein operation c) is performed to delete user information corresponding to the delete condition designated in the second sub-element of the received SOAP delete operation element.

2. The user metadata deletion method according to claim 1, further comprising:
   d) transmitting deletion results obtained at operation c) to the client.

3. The user metadata deletion method according to claim 2, wherein operation d) is performed so that the deletion results, transmitted to the client, are obtained by selecting one among values indicating deletion success, deletion error and nonexistence of data to be transmitted.

4. The user metadata deletion method according to claim 1, wherein:
   the element of the SOAP delete operation defined at operation a) further includes a third sub-element for designating a date (dateFrom), and
   operation c) is performed to delete user information transmitted on and after the date (dateFrom) designated in the third sub-element of the received SOAP delete operation element.

5. The user metadata deletion method according to claim 4, wherein:
   the element of the SOAP delete operation defined at operation a) further includes a fourth sub-element for designating a date (dateTo), and operation c) is performed to delete user information transmitted on and before the date (dateTo) designated in the fourth sub-element of the received SOAP delete operation element.

6. A method of deleting non-anonymous user metadata managed by a TV-Anytime metadata server using a simple object access protocol (SOAP) operation, the method comprising:
- a) providing a SOAP delete operation, a request element of the SOAP delete operation including an element for receiving start and end points of non-anonymous user metadata of a user to be deleted and a target table element for receiving a table to be deleted, and a response element of the SOAP delete operation including version information (serviceVersion) about a metadata capability description and reception results;
- b) receiving at the TV-Anytime metadata server the request element from a client of the TV-Anytime service; and
- c) deleting at the TV-Anytime metadata server the non-anonymous user metadata between the start and end points from the target table in response to reception of the request element, inputting deletion results and version information in the response element, and transmitting the response element to the client, wherein the TV-Anytime metadata server is located at a provider of the TV-Anytime service and keeps user metadata of a plurality of users including the user.

7. The non-anonymous user metadata deletion method according to claim 6, wherein operation a) is performed to restrict the target table to be deleted to a top level and a second level of an extended user description type (ExtendedUserDescriptionType).

8. A method of deleting non-anonymous user metadata managed by a TV-Anytime metadata server using a simple object access protocol (SOAP) operation, comprising the steps of:
- a) providing a SOAP delete operation, a request element of which includes an element for receiving start and end points of non-anonymous user metadata to be deleted and a target table element for receiving a table to be deleted, and a response element of which includes version information (serviceVersion) about a metadata capability description and reception results;
- b) a client inputting start and end points of non-anonymous user metadata to be deleted and a target table to be deleted, to the request element, and transmitting the request element to the TV-Anytime metadata server; and
- c) the TV-Anytime metadata server deleting the non-anonymous user metadata between the start and end points from the target table in response to reception of the request element, inputting deletion results and version information to the response element, and transmitting the response element to the client, wherein the TV-Anytime metadata server is located at a provider of a TV-Anytime service and keeps user metadata of a plurality of users including the non-anonymous user, and wherein the request and response elements of the SOAP delete operation provided at step e), is defined as follows;

```
<element name="clear_Personal_Data"
    type="tns:clear_Personal_DataType"/>
<complexType name="clear_Personal_DataType">
<sequence>
<element name="TimeFrom" type="tva:TVATimeType"
    minOccurs="0"/>
<element name="TimeTo" type="tva:TVATimeType"
    minOccurs="0"/>
<element name="TargetTable" type="tns:clear_TableType"
    minOccurs="0"
maxOccurs="unbounded"/>
</sequence>
</complexType>
<simpleType name="clear_TableType>
<restriction base="string">
<enumeration value="All"/>
<enumeration value="UserInformationTable"/>
<enumeration value="UsageEnvironment"/>
<enumeration value="BioGraphicInformation"/>
<enumeration value="AccessibilityInformation"/>
<enumeration value="TerminalInformationTable"/>
<enumeration value="NetworkInformationTable"/>
<enumeration value="NaturalEnvironmentInformationTable"/>
</restriction>
</simpleType>
<element name="clear_Personal_Data_Result"
    type="tns:clear_Personal_Data_Result"/>
<complexType name="clear_Personal_Data_Result">
<attribute name="serviceVersion" type="unsignedInt"
    use="required"/>
<attribute name="status" use="required">
<simpleType>
<restriction base="string">
<enumeration value="success"/>
<enumeration value="failed"/>
<enumeration value="no data"/>
</restriction>
</simpleType>
</attribute>
</complexType>.
```

9. The user metadata deletion method according to claim 1, wherein the user metadata of the identified user at the TV-Anytime metadata server is metadata transmitted through a submit-Data operation complying a TV-Anytime standard.

10. The user metadata deletion method according to claim 1, wherein the user metadata of the identified user at the TV-Anytime metadata server comprises at least one of user preference, usage history, and personal bookmarks.

11. The non-anonymous user metadata deletion method according to claim 6, wherein the user metadata of the identified user at the TV-Anytime metadata server is metadata transmitted through a submit-Data operation complying a TV-Anytime standard.

12. The non-anonymous user metadata deletion method according to claim 6, wherein the user metadata of the identified user at the TV-Anytime metadata server comprises at least one of user preference, usage history, and personal bookmarks.

* * * * *